(12) United States Patent
Schulz

(10) Patent No.: US 8,810,177 B2
(45) Date of Patent: Aug. 19, 2014

(54) SYSTEM AND METHOD FOR IMPLEMENTING A REMEDIAL ELECTRICAL SHORT

(75) Inventor: Stephen E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 124 days.

(21) Appl. No.: 13/611,379

(22) Filed: Sep. 12, 2012

(65) Prior Publication Data
US 2014/0070742 A1    Mar. 13, 2014

(51) Int. Cl.
*H02H 7/09*    (2006.01)

(52) U.S. Cl.
USPC ............. 318/400.22; 318/400.1; 318/400.2; 318/400.13; 318/400.26

(58) Field of Classification Search
USPC ............. 318/700, 400.02, 400.1, 400.13, 318/400.14, 400.21, 400.22, 400.26, 722, 318/434, 503
See application file for complete search history.

(56) References Cited

U.S. PATENT DOCUMENTS

| | | | |
|---|---|---|---|
| 6,348,775 B1 * | 2/2002 | Edelson et al. | 318/727 |
| 6,914,399 B2 * | 7/2005 | Kushion et al. | 318/434 |
| 7,800,350 B2 * | 9/2010 | Pigott | 323/271 |
| 8,107,267 B2 * | 1/2012 | Tallam et al. | 363/37 |

OTHER PUBLICATIONS

Jahns, Thomas M., Uncontrolled Generator Operation of Interior PM Synchronous Machines Following High-Speed Inverter Shutdown, IEEE Tansactions on Industry Applications, vol. 35, No. 6, Nov./Dec. 1999.

* cited by examiner

*Primary Examiner* — Bentsu Ro
*Assistant Examiner* — Thai Dinh
(74) *Attorney, Agent, or Firm* — Quinn Law Group, PLLC

(57) ABSTRACT

A vehicle includes a polyphase, permanent magnet synchronous electric machine, DC and AC buses, a battery module, a traction power inverter module (TPIM), and a controller. The controller, which is in communication with the TPIM, executes a method to detect a fault condition, fixes the pulse width modulation (PWM) duty cycles of all phases of the electric machine to 50% such that all phases switch simultaneously, and applies a polyphase OPEN state to the AC bus in response to the detected fault condition. The controller then transitions to a polyphase SHORT state by automatically inserting an adjustable deadtime at each PWM switching transition of the TPIM over a calculated ramp duration, thereby transitioning from an initial deadtime to a minimum deadtime over the calculated ramp duration. The transition reduces peak overshoot of the negative d-axis current of the machine during the fault condition.

20 Claims, 5 Drawing Sheets

SYSTEM AND METHOD FOR IMPLEMENTING A REMEDIAL ELECTRICAL SHORT

TECHNICAL FIELD

The present disclosure relates to a method and a system for implementing a remedial electrical short.

BACKGROUND

Interior permanent magnet (IPM) synchronous machines are commonly used as electric traction motors in hybrid electric and battery electric vehicles. IPM synchronous machines are energized via a DC power source, typically a rechargeable battery module, in conjunction with a current-controlled voltage source inverter. However, the permanent magnets used in the rotors of such machines can complicate the response taken by a motor controller to a detected motor or drive system fault.

For instance, at higher motor speeds, the rotating magnets can create a back electromagnetic force (EMF) voltage in the motor's stator windings. If switching within the voltage inverter is temporarily disabled in response to a detected fault, the back EMF voltage may cause diodes within the inverter to conduct, thereby allowing electrical current to flow back toward the battery module. This current flow condition is commonly referred to as an "UnControlled Generator" (UCG) state. UCG state characteristics may include the presence of a relatively large amount of regenerative braking torque acting on the machine, as well as conduction of significant electrical current back to the battery module.

To combat this result, controllers of IPM-type synchronous machines may execute, for an example three-phase machine, a three-phase short as a fault condition remedial action. Semiconductor switches of the voltage inverter are turned on simultaneously to cause the three-phase short, which in turn prevents electrical current from flowing to or from the battery module. At higher motor speeds, braking torque is relatively low, which is favorable for traction drive applications. The machine impedance will limit the motor currents during a three-phase short operation. Additionally, stator current approaches the characteristic current of the machine for most motor speeds. However, while a three-phase short remains a viable fault response, conventional approaches for implementing the three-phase short remain less than optimal.

SUMMARY

A system is disclosed herein that includes a polyphase permanent magnet synchronous electric machine, a DC bus, an AC bus, a DC voltage supply such as a battery pack or a fuel cell, a power inverter module (PIM), and a controller. The PIM is electrically connected to the DC voltage supply via the DC bus, and to the electric machine via the AC bus. The PIM includes a set of semiconductor switches that are activated via the controller to convert an AC voltage to a DC voltage, and vice versa. The controller is in communication with the PIM, and is configured to detect a fault condition in the system. Upon detection, the controller fixes the pulse width modulation (PWM) duty cycles of all phases of the electric machine to 50%, such that all phases switch simultaneously.

The controller applies a polyphase OPEN state to the AC bus in response to the detected fault condition, and transitions to a polyphase SHORT state by automatically inserting an adjustable deadtime at each PWM switching transition of the PIM over a computed ramp duration. In this manner, the controller transitions from a computed initial deadtime to a minimum deadtime over the computed ramp duration. The transition reduces peak overshoot of the negative d-axis current of the machine during the fault condition.

A method is also disclosed herein for implementing the polyphase short noted above in a vehicle having a motor drive system that uses an IPM-type electric traction motor and a traction power inverter module (TPIM).

Additionally, a vehicle is disclosed that includes a controller, a three-phase, permanent magnet synchronous electric machine in the form of an electric traction motor having a negative d-axis current, and a planetary gear set coupled to an output member of the electric machine, and that receives motor torque from the traction motor. The vehicle also includes DC and AC busses, a DC power supply, and a TPIM that is electrically connected to the DC power supply via the DC bus, and to the traction motor via the AC bus. The TPIM includes a set of semiconductor switches that are controlled to convert an AC voltage to a DC voltage, and vice versa. The controller is configured to execute the method noted above.

As disclosed herein, all embodiments of the present invention use an approach referred to herein as Intelligent Deadtime Transition or IDT to provide a ramped transition to a polyphase short state, and to thus minimize any d-axis current overshoot of the type noted above. The controlled transition is enabled between the polyphase OPEN and polyphase SHORT states. During this transition, pulse width modulation (PWM) is employed via the PIM in such a manner that all phase legs of the PIM are operated at a 50% duty cycle. The deadtime of the PIM is dynamically adjusted via the controller to provide an effective transition from the OPEN state to the SHORT state. Once the transition is complete, a solid polyphase short is applied. In the most basic implementation of the present control method, feedback sensors are not required, although such sensors may be used in other embodiments to improve performance.

The above features and advantages and other features and advantages of the present invention are readily apparent from the following detailed description of the best modes for carrying out the invention when taken in connection with the accompanying drawings.

DETAILED DESCRIPTION

Figure 1:
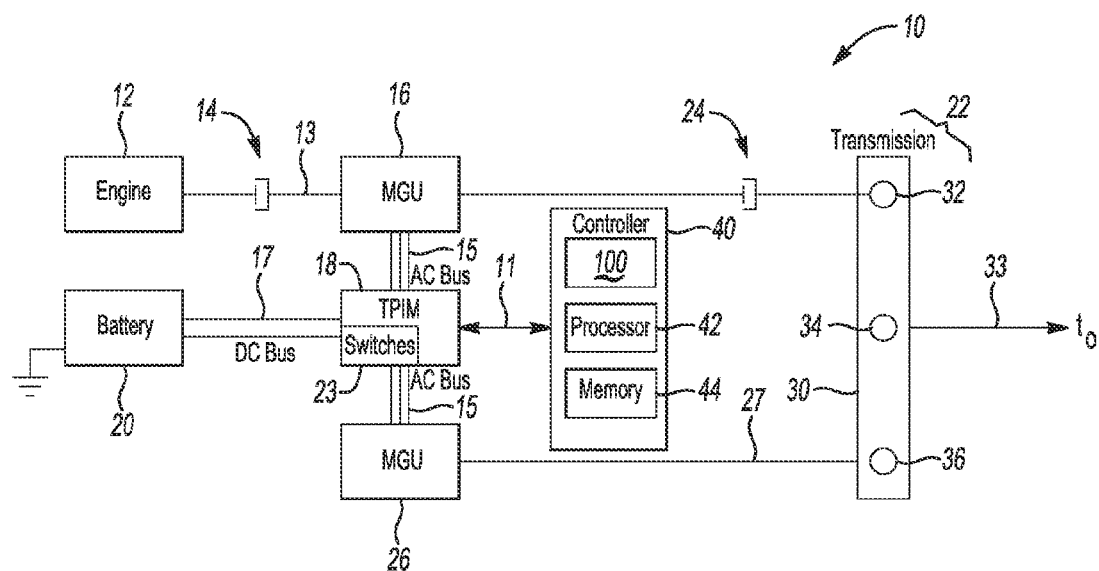
FIG. 1 is a schematic illustration of an example vehicle having a polyphase electric machine, a power inverter module, and a controller which implements a polyphase short state aboard the vehicle as set forth herein.

Referring to the drawings, an example vehicle 10 is shown schematically in FIG. 1. The vehicle 10 includes first and second motor/generator units 16 and 26. Both MGUs 16 and 26 are polyphase interior permanent magnet (IPM) electric machines in the form of electric traction motors. The MGUs 16, 26 may be rated for approximately 60-300VAC or more depending on the embodiment. The MGU 16 and 26 are controlled via a motor controller 40, e.g., a hybrid control module or a motor control module, which selectively executes code embodying a method 100, an example of which is shown in FIG. 5 and described in detail below.

Execution of the method 100 causes the controller 40 to selectively apply a three-phase short to an AC bus 15 of the vehicle 10 in response to a detected electrical, overspeed, and/or other fault in the drive system. While a three-phase short is described hereinafter for illustrative consistency, the present approach is applicable to any polyphase electric machine, e.g., a five-phase machine. There are many possible types of fault conditions that may be detected in the drive system of the vehicle 10, such as rotor position, current, and/or voltage sensor faults or a performance fault such as overcurrent or overspeed, all of which may be monitored by the controller 40.

In the non-limiting example embodiment shown in FIG. 1, the vehicle 10 also includes an internal combustion engine 12 and a transmission 22 having at least one gear set 30. A DC battery module 20 or another suitable DC voltage supply, e.g., a fuel cell, is electrically connected to the first and second MGUs 16, 26 via the DC bus 17 and a traction power inverter module (TPIM) 18. An optional damping/input clutch 14 may be used to selectively disconnect the engine 12 from the driveline, for instance during a restart of the engine 12 after an auto-stop event.

An output shaft 13 of the engine 12 is connected to the first MGU 16, such that when the engine 12 is running, the first MGU 16 is energized via engine torque and may be used to generate motor torque, which may be used in turn either to propel the vehicle 10 or to recharge the battery module 20 depending on the transmission operating mode. The second MGU 26 may be used to power the vehicle 10 or to charge the battery module 20 regardless of the state of the engine 12. Other embodiments of the vehicle 10 may be envisioned with only one MGU 16 or 26, with or without the engine 12, without departing from the intended inventive scope. However, for illustrative consistency, only the two-motor configuration of FIG. 1 will be described hereinafter.

The planetary gear set 30 shown in the example embodiment of FIG. 1 may include first, second, and third nodes 32, 34, and 36. As is understood in the art, such nodes may correspond to a ring gear, sun gear, and planetary gear, either respectively or in another order depending on the embodiment. A rotating clutch 24 may be selectively engaged in some modes to connect the first MGU 16 to the first node 32. The second MGU 26 may be directly connected to the third node 36 via an interconnecting member 27, i.e., with "directly" meaning that no intervening components are positioned between the second MGU 26 and the third node 36. In this particular embodiment, an output member 33 of the transmission 22 may deliver transmission output torque (arrow To) to a set of drive wheels (not shown) to propel the vehicle 10.

An AC bus 15 connects the respective first and second MGUs 16 and 26 to the TPIM 18. The TPIM 18, as is well known in the art, contains a set of semiconductor switches 23, e.g., IGBTs or MOSFETs, which are rapidly switched via pulse width modulation (PWM) to convert a DC voltage to an AC voltage for use by the respective first and/or second MGUs 16, 26, and for converting the AC voltage from the MGUs 16, 26 back into a DC voltage at a level suitable for storage in the battery module 20. Other high-voltage power components such as a DC-DC converter (not shown) may be used to step down the inverted voltage to auxiliary levels, as is well known in the art.

The controller 40 shown in FIG. 1 is in communication with the various components of the vehicle 10, particularly the TPIM 18, the first and second MGUs 16, 26, and the battery module 20, e.g., over a controller area network (CAN) bus. The controller 40, in executing the present method 100, may selectively implement the polyphase short via transmission of a set of command signals (double headed arrow 11) in response to a detected fault condition. The controller 40 may transition to the polyphase short using the processor 42, which also performs any required motor control algorithms, for example, vector control. The processor 42 outputs gate drive signals directly to the semiconductor switches 23 of the TPIM 18 shown in FIG. 1.

Implementation of the polyphase short state ensures that electrical current is not fed back to the DC bus 17 from the TPIM 18, and that a low braking torque is applied upon such failure at higher motor speeds. Prevention of electrical current backflow to the DC bus 17 helps prevent the TPIM 18 from charging the DC bus 17 to levels that could affect the performance or structural integrity of sensitive electrical components, for instance components of the TPIM 18 itself and/or other sensitive components such as any auxiliary power supplies, diodes, relays, and bypass capacitors. It also prevents flow of uncontrolled and potentially harmful charging current into the battery module 20.

Still referring to FIG. 1, the controller 40 may be embodied as hardware devices and associated software. The hardware/software may be contained in a single physical device such as a host machine, or it may be distributed throughout multiple controllers of the vehicle 10. For illustrative simplicity, the controller 40 is shown as one device. However, those of ordinary skill in the art of hybrid powertrains will recognize that control functionality is frequently distributed throughout different hardware/software modules, e.g., a top-level hybrid controller, a motor controller responsible for motor vector control and other motor control functionality, a battery control module, an air conditioning control module, etc. Additionally, while the TPIM 18 and controller 40 are shown separately in FIG. 1, in an actual embodiment the TPIM 18 may be an integrated unit having a DC capacitor, bus bars, IGBTs, gate drives, current sensors, and a control card(s). Therefore, aspects of the present approach related to control of the TPIM 18 may take place at the appropriate level of control within the overall architecture of the controller 40.

The controller 40 of FIG. 1 includes at least a processor 42 and a tangible, non-transitory memory device(s) 44 on which is recorded instructions embodying the various steps of the method 100. The processor 42 is physically coupled to the memory device 44. Execution of the instructions by the processor 42 causes the controller 40 to implement the transition to a SHORT condition in the manner set forth herein.

The memory device 44 may be any computer-readable medium, including optical and/or magnetic disks and other persistent memory. Instructions, including the command signals (double-headed arrow 11), which include any required gate signals, may be transmitted to the various elements of the vehicle 10 by transmission lines such as coaxial cables, copper wire, fiber optics, and the like.

While imposition of a controlled polyphase SHORT state has definite advantages, it also has, absent implementation via the present method 100, a number of potential drawbacks. In a typical response, such as when an IPM-type motor is spinning at a relatively high rate of speed, e.g., 1500 RPM, with no load and with zero current, application of a polyphase short can cause the phase currents of the motor to spike. The envelope of the phase currents then slowly decays, e.g., over tens of milliseconds, to a steady-state value, which is also known as the machine characteristic current. The actual decay rate is a function of the parameters of the electric machine, e.g., the MGUs 16, 26.

The phase currents may be transformed mathematically to the synchronously rotating reference frame, i.e., the well known d-q motor control reference frame. In this case, the d-axis is typically aligned to the north pole of the rotor magnet. Hence, a negative d-axis current will generate a magneto-motive force (MMF) to oppose the magnet flux. If opposing flux becomes sufficiently large, it can demagnetize the rotor magnet. The present approach can be used to minimize this effect.

Intelligent Deadtime Transition (IDT)

The present method 100 is referred to herein as Intelligent Deadtime Transition (IDT). In executing IDT, the controller 40 of FIG. 1 automatically reduces the peak overshoot of the negative d-axis current and thereby minimizes oscillations in the stator current and motor torque. Instead of applying a fixed step change in applied voltage, the controller 40 of FIG. 1 provides a smooth, ramped transition from an OPEN state to a SHORT state over an adjustable transition period. During this transition period, the TPIM 18 is operated with PWM. Within one PWM switching period, however, the controller 40 time-averages brief SHORT and OPEN state segments. By adjusting the relative duration of these two segments, the TPIM 18 can smoothly and effectively transition from OPEN to SHORT states.

While in the OPEN state, assuming the motor back EMF is higher than the voltage level of the DC bus 17, motor voltage will cause the diodes of the TPIM 18 to conduct and carry some phase current, i.e., the UnControlled Generator (UCG) mode. In UCG mode, motor voltage is maximized at the six-step voltage, i.e., the maximum voltage that is attainable from a three-phase voltage source inverter such as the TPIM 18, assuming that each diode conducts for 180 electrical degrees. Conversely, while the TPIM 18 is in the SHORT state, the applied motor voltage is zero. If a PWM period is split between OPEN and SHORT states, the resultant time-averaged motor voltage is proportional to the time-weighted average of each of the two state voltages, i.e., the six-step voltage and zero volts. The controller 40 of FIG. 1 automatically adjusts the relative duration of the OPEN and SHORT states to achieve any desired motor voltage. Therefore, motor voltage may be smoothly transitioned by the controller 40 from the maximum six-step voltage down to zero volts.

The behavior described above is achieved by setting the PWM mode, via the controller 40, to either left justified or right justified. As is known in the art, single-edge modulation allows one edge of a PWM signal to be modulated while the other edge remains fixed relative to the clock pulse. In right justified PWM, which is also referred to as leading-edge modulation, the rising edge of the pulse is delayed from the beginning of the clock period while the falling edge remains fixed at the end of the clock period. Left justified PWM, which is also referred to as trailing-edge modulation, fixes the leading edge on the beginning of the clock period and delays the falling edge. Either justification may be used in executing the method 100.

In the present approach, the controller 40 fixes the duty cycles of all phases to 50% so that all phases switch simultaneously. Including the deadtime, there are three different states during one PWM period, two of which are unique. When all of the upper or lower switches of the semiconductor switches 23 are turned on, an effective SHORT is created to the controlled motor, and thus a 0 VAC condition ensues on the AC bus 15. In an embodiment in which MGUs 16 and 26 are both used, the MGUs 16, 26 are controlled independently of each other, and AC outputs going to each machine are likewise independent.

Additionally, at each PWM switching transition the TPIM 18, via the command signals (double-arrow 11) from the controller 40 shown in FIG. 1, automatically inserts deadtime to avoid cross-conduction of the upper and lower switches within the TPIM 18, a condition which would essentially short out the battery module 20, possibly resulting in damage to the semiconductor switches 23. During the duration of the inserted deadtime, the semiconductor switches 23 are held off, i.e., the OPEN state is active.

During the duration of the OPEN state, the terminal voltage of the controlled motor, for instance the second MGU 26, is determined by the relation of the motor back EMF to the DC link voltage, i.e., the voltage of the DC bus 17, and the values of the three phase currents. If the back EMF is greater than the DC link voltage, then the terminal voltage may be treated as the six-step voltage due to the conduction of the diodes within the TPIM 18. The controller 40 changes the time duration of the deadtime within the PWM period to adjust the applied voltage from the TPIM 18.

Polyphase Short Transition

To perform the transition to the polyphase SHORT state, the controller 40 enables and selects either left-justified or right justified PWM for the TPIM 18. The controller 40 then sets the initial deadtime to a maximum deadtime value, $T_{d\_max}$:

$$T_{d\_max} = \frac{T_{SW}}{2} - T_{min\_PW}$$

where $T_{SW}$ is the PWM switching period and $T_{min\_PW}$ is the minimum pulse width limits of the TPIM 18, which is a characteristic of the design of the particular TPIM 18 being used. The maximum deadtime value, $T_{d\_max}$, can be selected to provide maximum OPEN time within the minimum pulse width limits. The value is slightly less than one half of the overall switching period ($T_{SW}$) for a typical inverter module.

Minimum deadtime, $T_{d\_min}$, is the deadtime value used during normal inverter operation, e.g., 3 μs, and is determined by hardware requirements. Actual deadtime, $T_d$, is constrained to remain within the minimum and maximum values:

$$T_{d\_min} \leq T_d \leq T_{d\_max}$$

In order to transition from the OPEN state to the SHORT state, the controller 40 of FIG. 1 linearly adjusts the deadtime from the maximum value ($T_{d\_max}$) to the minimum value ($T_{d\_min}$) over a predetermined period. This transition is explained below with reference to FIG. 4.

Figure 2A:
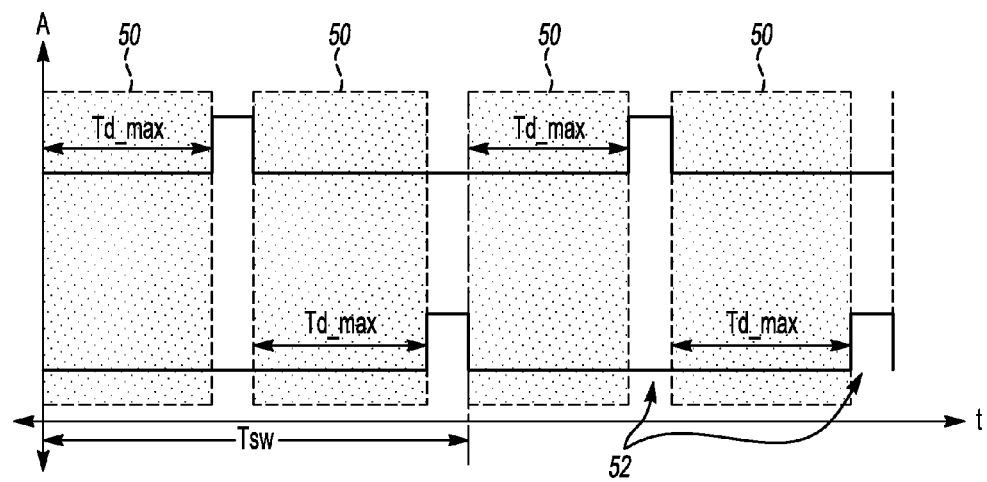
FIG. 2A is an amplitude time plot showing maximum deadtime approximating a full open state condition.
Figure 2B:
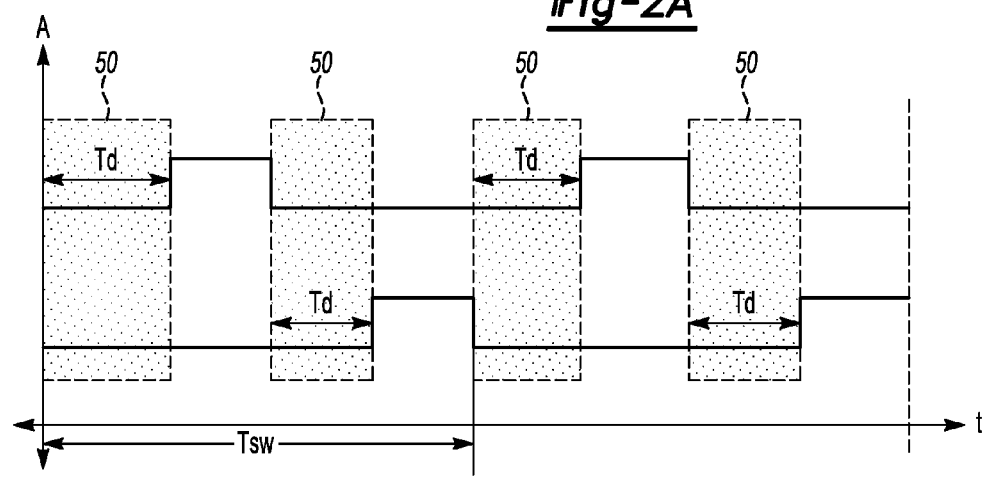
FIG. 2B is an amplitude time plot of example waveforms describing a deadtime that is sufficient for producing approximately 50% of a six-step voltage.
Figure 2C:
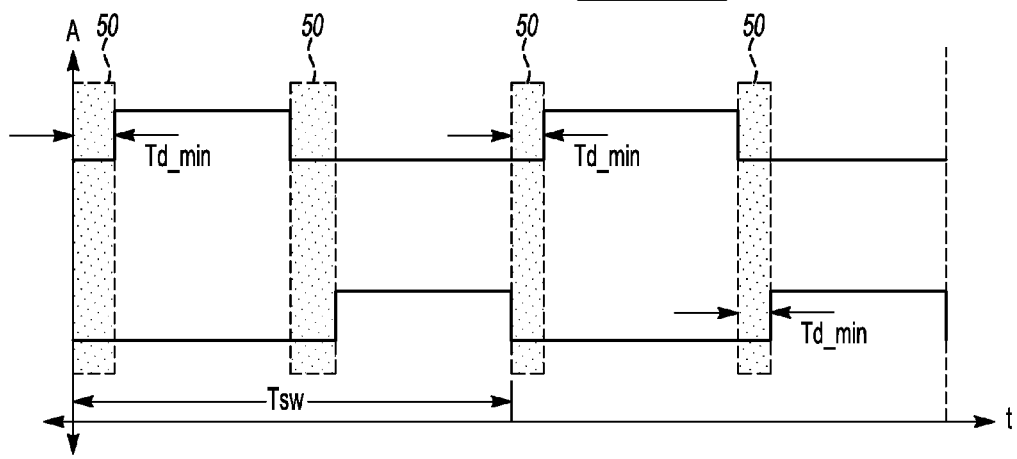
FIG. 2C is an amplitude time plot of example waveforms having a minimum deadtime simulating a SHORT state condition.

Referring to FIGS. 2A-C, these three Figures illustrate three different waveforms describing upper and lower switch drive signals, for upper and lower switches of the semiconductor switches 23 shown in FIG. 1, for respective deadtime values. In each of these Figures, the shaded areas 50 represent the UCG state explained previously hereinabove.

In FIG. 2A, the deadtime is set to the maximum value ($T_{d\_max}$) in order to approximate the OPEN state. FIG. 2B shows an intermediate deadtime value that results in an approximately 50% OPEN state and about 50% of the six-step voltage. FIG. 2C shows the minimum deadtime value ($T_{d\_min}$), which results in a low, non-zero motor voltage. FIGS. 2A-C collectively illustrate how by adjusting deadtime of the TPIM 18, the controller 40 of FIG. 1 can smoothly transition from an effective OPEN state all the way to a SHORT state.

Optimal Transition Time Determination

Figure 3:
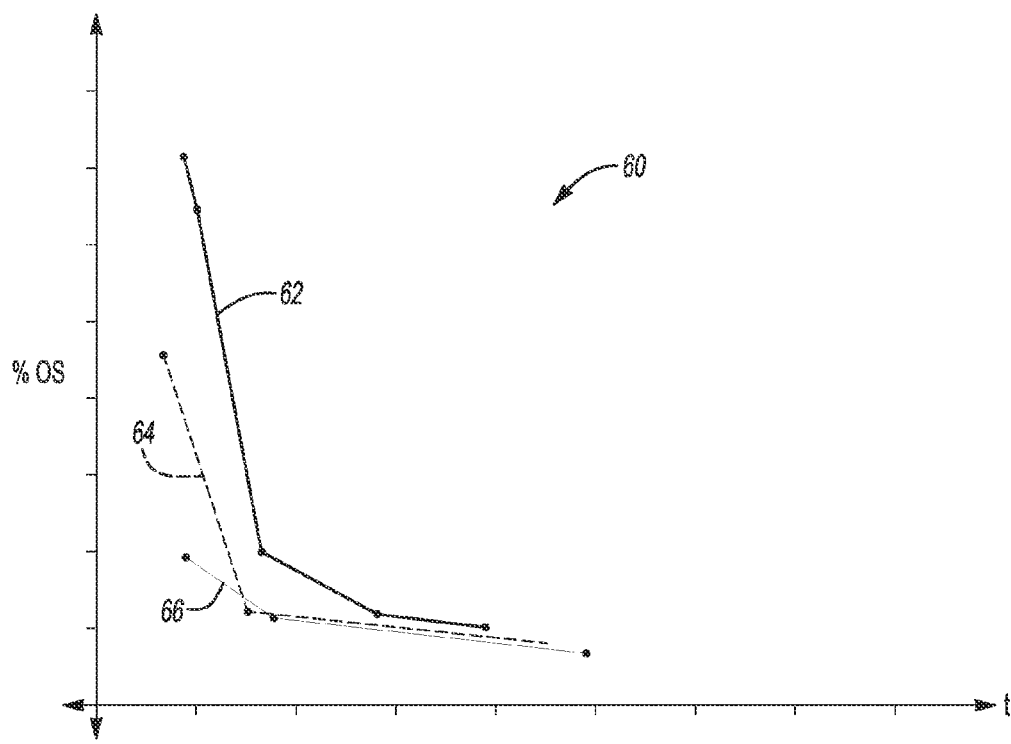
FIG. 3 is an amplitude time plot describing d-axis current overshoot versus rise time via example voltage/speed pairs.

Referring to FIG. 3, a set of traces 60 illustrates examples of three different example voltage/speed traces 62, 64, and 66. The percentage of motor current peak overshoot (% OS) is plotted with respect to the Y axis, i.e., the peak d-axis current with respect to steady-state SHORT current, while transition time is plotted on the X axis, with time normalized in FIG. 3 to the motor fundamental period $T_e$ for various operating conditions, i.e., different speeds and DC voltages. The optimal transition time, which is defined herein as being the fastest available transition time still having an acceptable current overshoot, is a function of the motor electrical period, which in turn is proportional to motor speed.

FIG. 3 illustrates the fact that motor current peak overshoot can be limited to under approximately 10% if the transition time is set to approximately 2-3 times the motor fundamental electrical period. Therefore, the controller 40 of FIG. 1, in executing the method 100, can use the measured motor speed, if such data is available, in order to determine the optimal transition time, and can set the transition time to the desired value to achieve a specific overshoot value.

For example, rise time ($t_r$) can be set to 300% of the fundamental electrical period to maintain approximately 10% overshoot on the current transient during the transition to the SHORT state. At low motor speeds, the fundamental period becomes prohibitively long. However, under these conditions motor dynamics become more damped, and thus current overshoot becomes less of a concern. Therefore, transition time may be limited to a maximum value, for example 50 ms, to avoid a prolonged transition while maintaining acceptable levels of current overshoot.

Deadtime Initial Condition

To perform the transition to the SHORT state, the controller 40 first determines the initial value to use for the imposed deadtime. If motor speed is high and back EMF of the motor exceeds the available DC link voltage, then the controller 40 may set the PWM duty cycle at the maximum value, i.e., $T_{d\_max}$, which is described above. However, if motor speed is relatively low and the back EMF is less than DC link voltage, as deadtime ramps from the maximum value, $T_{d\_max}$, no average current will flow until the time averaged PWM voltage equals the back EMF. For very low motor speeds, a significant portion of the ramp time will be wasted without building average current. This condition can result in unwanted overshoot, as the effective rise time will be less than desired.

For this reason, the controller 40 of FIG. 1 may start at something other than the maximum deadtime during some operating conditions. The controller 40 can compute a deadtime value that will make the output voltage from the TPIM 18 of FIG. 1 match the back EMF of the motor being controlled, e.g., the second MGU 26 of FIG. 1. The following equation may be used by the controller 40:

$$\%UCG = \text{MIN}\left(\frac{BEMF}{V_{DC}}, 1\right)$$

where BEMF is the motor back EMF (scaled to line-to-line peak volts), $V_{DC}$ is the DC link voltage, and % UCG is the desired percentage of UCG. The controller 40 may then convert the desired percentage of UCG to a deadtime value which can be used as an initial condition ($T_{d\_IC}$) for the transition to SHORT. For example:

$$T_{d\_IC}=(T_{d\_max})(\% \text{ UCG})$$

The initial condition in this approach requires motor speed information in order to compute the back EMF, as well as DC link voltage information to determine the percent UCG initial condition. If either of these signals is not available, the transition may commence using maximum deadtime as the initial condition.

Speed Estimation for Failed Speed Sensor Condition

Motor speed is not available in some cases. The controller 40 may estimate the motor speed in this instance. To do so, at least two functional phase current sensors are required. For a Y-connected motor with open neutral, the third phase current can be computed as the negative of the sum of the other two, i.e., $i_c = -i_a - i_b$, as is well known in the art.

The currents of the ABC stationary frame for the motor being controlled, e.g., the second MGU 26, can be transformed by the controller 40 of FIG. 1 into the equivalent αβ stationary frame quantities as follows:

$$\begin{bmatrix} \alpha \\ \beta \end{bmatrix} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} a \\ b \\ c \end{bmatrix}$$

For a balanced system, a+b+c=0, and therefore:

$$\alpha = a$$

$$\beta = \frac{b-c}{\sqrt{3}}$$

The time derivative of the angle of the resulting current vector may be used to estimate motor speed. Since the derivative term is inherently noisy, the signal can be averaged over a suitable time period, for example 3 ms. The resulting estimated speed calculation provides adequate accuracy for the proposed method 100. This estimation approach is used by the controller 40 only when the speed sensor is faulted and current is flowing in the controlled motor. It may be necessary for the controller 40 to reduce the deadtime to a point at which current flows in order to estimate the motor speed, as is described below with reference to FIG. 5.

The αβ currents in the above equation are sinusoidal quantities with a 90 degree phase shift. The angle of the stator current vector γ can be computed as follows:

$$\gamma = \tan^{-1}\left(\frac{\beta}{\alpha}\right)$$

The instantaneous motor angular velocity, $\omega_r$, can then be computed as the time derivative of the stator current position γ, which can be computed as the change in position over consecutive switching periods:

$$\omega_r = \dot{\gamma} = \frac{\gamma[k] - \gamma[k-1]}{T_{SW}}$$

where γ[k] is the current vector angle during the latest sample period, and γ[k−1] is the current vector angle during the previous sample period. Since the calculation of the instantaneous motor angular velocity is susceptible to noise, the result may be passed through a moving average filter to smooth the result and provide acceptable accuracy with minimal computational overhead.

Enable Deadtime Compensation for Smooth Transition to Zero Volts

During the transition period when deadtime is dynamically adjusted by the controller 40, deadtime compensation (DTC) is not used. DTC is a known technique wherein the phase duty cycles of an inverter, e.g., the TPIM 18 of FIG. 1, are adjusted to offset the effect of the inverter deadtime. This approach is often employed in voltage source inverters to improve voltage linearity and to reduce distortion. However, during the control phase of method 100 wherein deadtime is dynamically adjusted to insert a variable duration OPEN segment into each PWM period, employing DTC could corrupt the desired effect. Hence, it is necessary that DTC be disabled by the controller 40 whenever the controller 40 is dynamically adjusting the deadtime.

As shown in FIG. 2C, the minimum deadtime ($T_{d\_min}$) is limited by the requirements of the TPIM 18 to prevent cross-conduction of the upper and lower switches of the semiconductor switches 23 shown in FIG. 1. Deadtime cannot be reduced all the way to zero. The deadtime is typically in the order of 3 μs for inverters operating with 600VDC rated power devices. Hence, the controller 40 cannot set the motor voltage to zero volts in the present IDT approach. For a 10 kHz PWM period with two 3 μsec deadtime insertions per PWM period, this would result in 6 μs of OPEN state for each 100 μsec period as a minimum limit, or about 6%. Thus, when deadtime has ramped all the way to its minimum value and a solid SHORT state has been applied by the controller 40, the motor being controlled will see a step change in voltage of at least 6% of back EMF. This may introduce an unwanted transient in motor current. The effect may be more pronounced at low motor speeds when back EMF is less than the DC link voltage. In these cases, the step change can be significantly greater than 6%.

In order to compensate for this effect, the controller 40 may enable DTC once the deadtime has reached its minimum value. Rather than enabling DTC immediately, the controller 40 can gradually phase in DTC to gradually lower the effective motor voltage to zero. By doing this, the motor will see a smooth linear reduction in motor voltage over the entire transition period, thus minimizing the current transient.

Figure 4A:
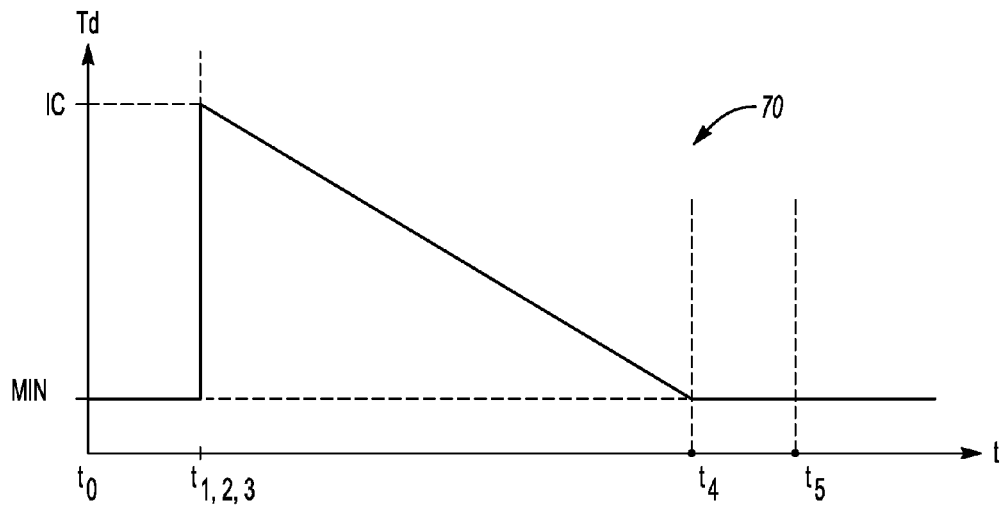
FIGS. 4A and 4B are timing diagrams illustrating enablement of deadtime control in the vehicle of FIG. 1.
Figure 4B:
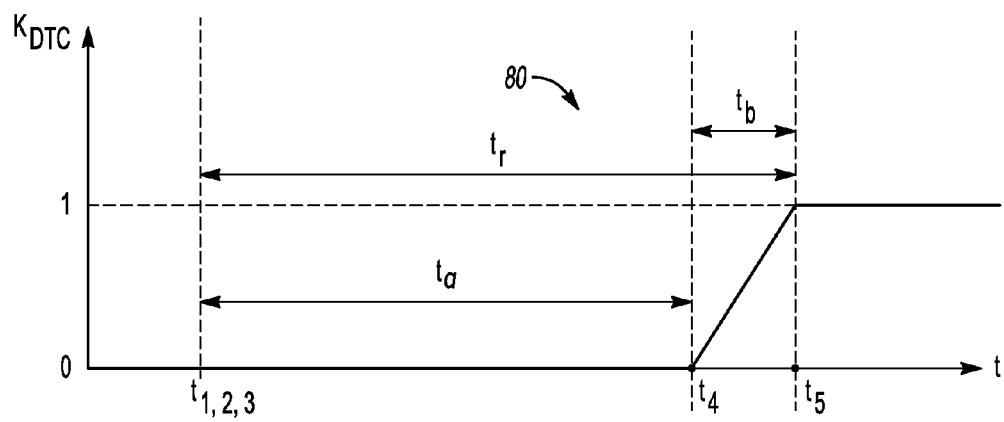
Figure 6:
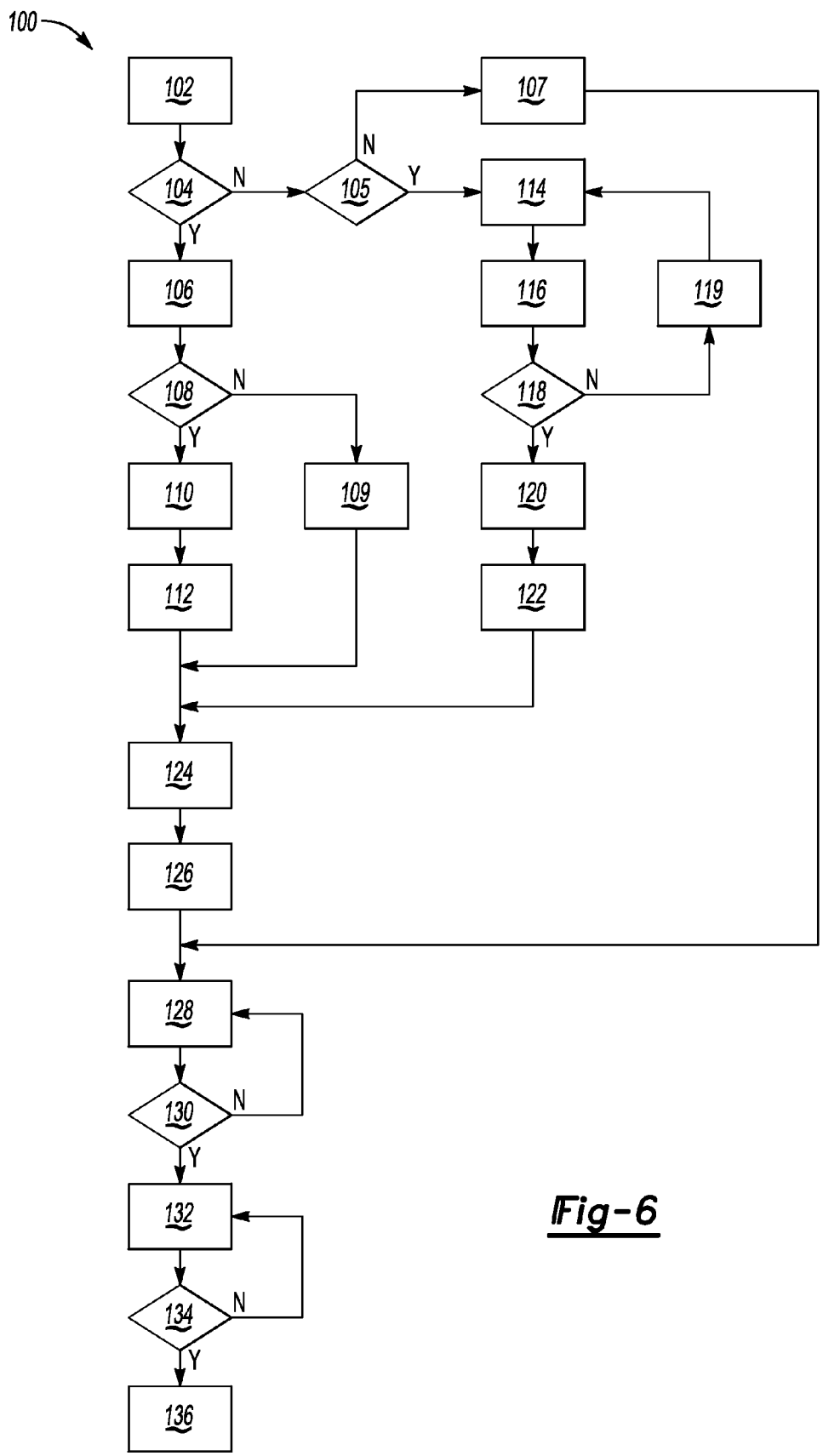
FIG. 6 is a flow chart describing an example method for implementing a three-phase short in the vehicle 10 of FIG. 1.

Referring to FIGS. 4A and 4B, example timing diagrams illustrate how DTC may be selectively employed by the controller 40 of FIG. 1 for two possible paths of the method 100 flowchart shown in FIG. 6, i.e., when step 104 is answered in the affirmative (Y), or when steps 104 and 105 are both answered in the negative (N). In these two cases, steps 114-122 are not executed.

FIGS. 4A and 4B illustrate how DTC is employed once deadtime reaches its minimum value ($T_{d\_min}$), providing a way to smoothly decrease motor voltage to zero. Trace 70 of FIG. 4A represents the deadtime with respect to the initial conditions (IC). An OPEN state is present between $t_0$ and $t_1$ as all semiconductor switches are opened to allow initial current to approach the UCG value. Deadtime (trace 70) is ramped downward at $t_3$ until $t_4$. Trace 80 of FIG. 4B is a corresponding trace that illustrates a gain factor, $K_{DTC}$, that is applied to the final DTC duty cycle adjustment between $t_4$ and $t_5$. In the embodiment of FIGS. 4A-4B, step 104 shown in FIG. 6 is answered in the affirmative (Y), i.e., a speed sensor of the MGU 16 or 26 is available.

FIGS. 4A and 4B are also pertinent when speed and current sensors are faulty or unavailable, i.e., steps 104 and 105 are both answered in the negative. In these cases, steps 114-122 of the method 100 shown in FIG. 6 are not executed, and thus the controller 40 begins the deadtime transition at $t_3$. Thus, in FIG. 4A the value of the deadtime (trace 70) is at its initial condition (IC) at t, $t_2$, and $t_3$. FIG. 4A is thus simplified by the notation $t_{1,2,3}$. At these points in time, left justified or right justified PWM is enabled.

The transition from the OPEN state to the SHORT state commences at $t_{1,2,3}$ and occurs over the rise time $t_r$. During the first phase ($t_a$), i.e., the duration between $t_{1,2,3}$ and $t_4$, deadtime is ramped linearly from $T_{d\_max}$ down to the minimum value $T_{d\_min}$. During the second phase ($t_b$) commencing at $t_4$, the controller 40 may enable DTC. DTC is linearly phased in to provide a smooth transition to the SHORT state. With this feature, there is minimal disturbance to the phase current over the period ($t_b$), and motor voltage linearly decreases over the entire transition period. To employ DTC, measured phase current information is needed. In the event the current sensor has failed, this final DTC phasein over the duration of $t_b$ would not be used.

Figure 5A:
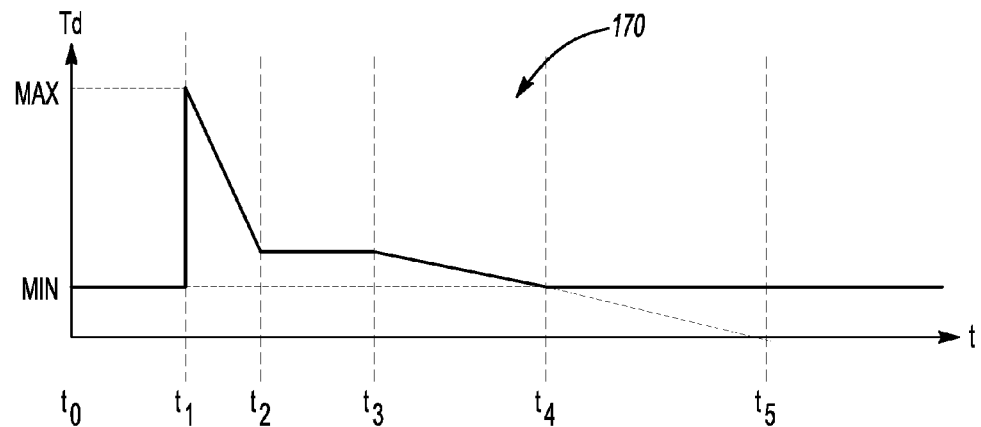
FIGS. 5A and 5B are timing diagrams illustrating enablement of deadtime control in the vehicle of FIG. 1 when a speed sensor is faulty or unavailable.
Figure 5B:
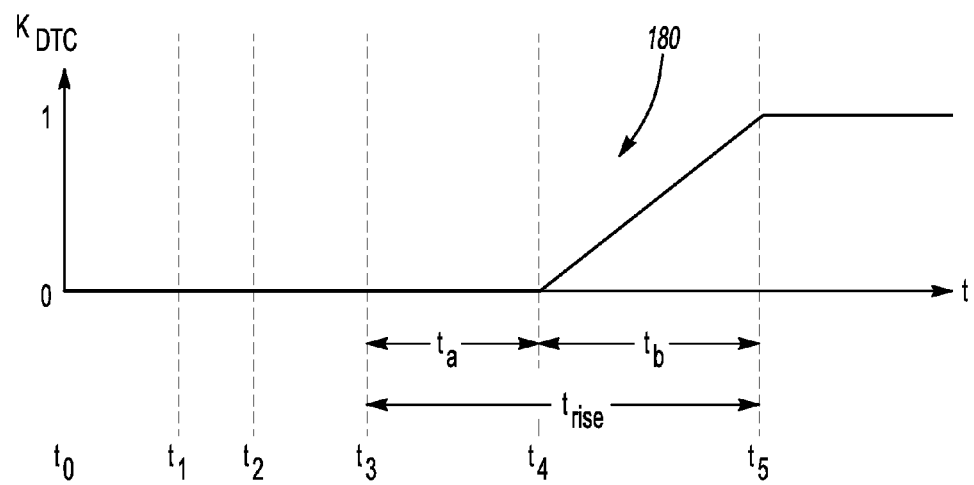

FIGS. 5A and 5B illustrate the case in which a speed sensor for the MGU 16 or 26 is faulty or unavailable, but current data for the MGU 16 or 26 is available, i.e., when step 104 is answered in the negative (N) and step 105 is answered in the affirmative (Y). In this situation, steps 114-122 are executed. Generally, starting in an OPEN state at $t_1$, trace 170 of FIG. 5A illustrates the controlled downward ramping of deadtime ($T_d$) until $t_2$, when the phase current reaches a calibrated threshold. This deadtime is held constant until $t_3$ while the speed of the MGU 16 or 26 is estimated. Starting at $t_3$ the controller 40 continues with the transition using the newly calculated ramp duration, reaching the minimum deadtime at about $t_4$. This level is then held constant until $t_5$, the end of the transition. Between times $t_4$ and $t_5$ the DTC is linearly phased in to bring the effective motor voltage to zero. FIGS. 4A-5B are described in further detail below in conjunction with FIG. 6.

FIG. 6 shows an example flowchart for executing the present method 100. Details of various steps are provided above. Beginning at step 102, the controller 40, upon detecting a fault in one of the MGUs 16 or 26, opens the semiconductor switches 23 of the TPIM 18 for the one drive system having the fault. The method 100 then proceeds to step 104, possibly after pausing between $t_0$ and $t_1$ to allow the currents to approach the steady-state UCG current. This is shown in FIGS. 4A and 5A, with the OPEN state being present between $t_0$ and $t_1$.

At step 104, the controller 40 of FIG. 1 verifies whether speed data is available, whether from a speed sensor or otherwise. The controller 40 proceeds to step 106 if speed data is available. Otherwise, the controller 40 executes step 105.

At step 105, the controller 40, having determined at step 104 that speed data is not available, determines whether electrical current measurement data is available. If such measurement data is available, the controller 40 proceeds to step 114. Otherwise, the controller 40 executes step 107.

At step 106, the controller 40 shown in FIG. 1 calculates the back EMF of the MGU as explained elsewhere above, and then proceeds to step 108. The conditions of steps 106-112 are described with reference to FIGS. 4A-B.

At step 107, the controller 40 selects the maximum deadtime, $T_{d\_max}$, for the deadtime initial conditions and transition time to maximum value, for example, 50 ms, and proceeds to step 128.

At step 108, the controller 40 compares the calculated back EMF (BEMF) from step 106 to the DC link voltage (VDC). The controller 40 proceeds to step 110 if back EMF is less than the DC link voltage. Otherwise, the controller 40 proceeds to step 109.

At step 109, the controller 40 uses the maximum deadtime, $T_{d\_max}$, for deadtime initial conditions, and then proceeds to step 124.

At step 110, the controller 40 computes the ratio $$\frac{BEMF}{VDC},$$

records this in the memory device 44, and proceeds to step 112.

At step 112, the controller 40 determines the initial conditions for the imposed deadtime, and then proceeds to step 124.

At step 114, with reference to the traces 170 and 180 of FIGS. 5A and 5B which apply only to the conditions described in steps 114-122, the controller 40 computes the equivalent stationary frame currents Iα and Iβ from the measured phase current values, records this value in the memory device 44, and proceeds to step 116. As noted above, steps 114-122 are not executed when step 104 is answered in the affirmative (Y), or when steps 104 and 105 are both answered in the negative (N).

At step 116, the controller 40 computes the phase angle, ∠$\vec{I}_S$, and the amplitude |$\vec{I}_S$| from the stator current vector components Iα and Iβ of step 114, records this value in memory device 44, and proceeds to step 118.

At step 118, the controller 40 compares the amplitude calculated in step 116 to a calibrated threshold, and proceeds to step 120 if the amplitude exceeds the threshold. If the amplitude is less than or equal to the threshold, the controller 40 proceeds instead to step 119.

At step 119, as shown in FIG. 5A, the controller 40 ramps the deadtime ($T_d$) from $t_1$ to $t_2$ using a default rate, and then returns to step 114.

At step 120, the controller 40 dwells at the present deadtime. Instantaneous speed is computed from the rate of change of the stator current vector angle over time, and stored such that the average value can be computed in 122.

At step 122, during the duration of step 120, i.e., while dwelling at the present deadtime value, the controller 40 of FIG. 1 computes the average speed from the value ∠$\vec{I}_S$, and then proceeds to step 124.

At step 124, the controller 40 determines the transition time as a function of motor speed. Motor speed may be the actual speed measurement from step 104, or it may be computed in step 122. Once transition time has been determined, the controller 40 proceeds to step 126.

At step 126, the controller 40 computes the percentage of ramp time to allocate to adjusting the deadtime versus ramping in DTC. Once computed, the controller 40 proceeds to step 128.

At step 128, the controller 40 ramps the deadtime between $t_3$ and $t_4$, as shown in FIGS. 4A and 5A. The controller 40 then proceeds to step 130.

At step 130, the controller 40 determines whether deadtime is less than or equal to the minimum deadtime. If not, step 128 is repeated. Otherwise, the controller 40 proceeds to step 132.

At step 132, the controller 40 phases in deadtime compensation between $t_4$ and $t_5$, as shown in FIGS. 4B and 5B, and then proceeds to step 134.

At step 134, the controller 40 determines whether DTC is fully on. If so, the controller 40 proceeds to step 136. Otherwise, step 132 is repeated.

At step 136, the controller 40 applies the SHORT state at $t_5$ of FIGS. 4B and 5B.

Execution of the method 100 by the controller 40 shown in FIG. 1 as described above with reference to FIGS. 2A-6 has several possible advantages. One of the highest performing magnets in use today is the rare earth NeFeB-type. Several additives are used to enhance the properties of this magnet, with one of these being Dysprosium. Reducing the large transient negative d-axis current per the method 100 may enable a reduction in Dysprosium content without demagnetization, thereby reducing motor cost. Similar results are possible in lower cost ferrite magnets.

In any IPM motor design, regardless of magnet type, peak negative d-axis current is a design constraint. That is, a designer must optimize the rotor geometry to avoid demagnetization of the magnet under the peak negative d-axis current expected. Reduction of the peak current amplitude via the method 100 eases demagnetization concerns, thus potentially allowing for improved torque density and/or efficiency.

While the best modes for carrying out the invention have been described in detail, those familiar with the art to which this invention relates will recognize various alternative designs and embodiments for practicing the invention within the scope of the appended claims.

The invention claimed is:

1. A system comprising:
   a polyphase permanent magnet synchronous electric machine having a negative d-axis current;
   a DC bus;
   an AC bus;
   a DC power supply;
   a power inverter module (PIM) that is electrically connected to the DC power supply via the DC bus, and to the electric machine via the AC bus, wherein the PIM includes a set of semiconductor switches that are controlled to convert an AC voltage to a DC voltage, and vice versa; and
   a controller in communication with the PIM that is configured to:
   detect a fault condition in the system;
   determine an initial deadtime;
   set pulse width modulation (PWM) duty cycles of all phases of the electric machine to 50% such that all phases switch simultaneously;
   apply a polyphase OPEN state to the AC bus in response to the detected fault condition; and
   transition to a polyphase SHORT state as a remedial action by automatically inserting an adjustable deadtime at each PWM switching transition of the PIM over a calculated ramp duration, thereby transitioning from the initial deadtime to a minimum deadtime over the calculated ramp duration;
   wherein the transition reduces peak overshoot of the negative d-axis current of the electric machine during the detected fault condition.

2. The system of claim 1, wherein the electric machine is a three-phase AC traction motor, and wherein the polyphase OPEN state and the polyphase SHORT state are a three-phase OPEN and a three-phase SHORT state, respectively.

3. The system of claim 1, wherein the controller imposes the transition by selectively transmitting a set of command signals to the PIM to implement right-justified or left-justified PWM switching via the semiconductor switches.

4. The system of claim 1, wherein the controller automatically inserts the adjustable deadtime, at each PWM switching transition of the PIM, to thereby avoid cross-conduction of the semiconductor switches.

5. The system of claim 1, wherein the controller is configured to compute the transition time as a function of the fundamental electrical period of the electric machine.

6. The system of claim 1, wherein the controller is configured to:
determine a rotational speed of the electric machine;
receive a DC link voltage from the DC bus;
calculate, via a processor, a back electromotive force (EMF) of the electric machine using the determined speed; and
compute, using the processor, the initial deadtime based upon a ratio of the back EMF to the DC link voltage.

7. The system of claim 1, wherein the controller enables and phases in deadtime compensation over a computed time to complete a transition from the minimum deadtime to zero volts.

8. The system of claim 1, wherein the controller is configured to:
determine when a motor speed sensor is faulty or unavailable;
measure a current vector angle of phase currents of the electric machine when the motor speed sensor is faulty or unavailable and current is flowing in the electric machine;
calculate a filtered time derivative of the measured current vector angle; and
estimate a speed of the electric machine using the filtered time derivative.

9. The system of claim 1, wherein the controller, within one PWM switching period, time-averages brief SHORT and OPEN state segments.

10. A method comprising:
detecting a fault condition in a vehicle having a polyphase permanent magnet synchronous electric machine using a controller, wherein the controller is in communication with a power inverter module (PIM) having a set of semiconductor switches, and wherein the PIM is electrically connected to a DC battery module and to the electric machine;
setting the pulse width modulation (PWM) duty cycles of all phases of the electric machine to 50% such that all phases switch simultaneously;
applying a polyphase OPEN state to an AC bus in response to the detected fault condition;
determining an initial deadtime; and
transitioning over a calculated ramp duration to a polyphase SHORT state as a remedial action by automatically inserting an adjustable deadtime at each PWM switching transition of the TPIM, including transitioning from the initial deadtime to a minimum deadtime over the calculated ramp duration, to thereby reduce peak overshoot of a negative d-axis current of the electric machine during the detected fault condition.

11. The method of claim 10, further comprising:
setting the initial deadtime to a maximum deadtime value ($T_{d\_max}$) as a function of the PWM switching period and a minimum pulse width limit of the TPIM.

12. The method of claim 11, wherein the function is executed by the controller, and is equal to:

$$T_{d\_max} = \frac{T_{SW}}{2} - T_{min\_PW}$$

where $T_{SW}$ is the PWM switching period and $T_{min\_PW}$ is the minimum pulse width limit of the TPIM.

13. The method of claim 10, further comprising:
transmitting command signals from the controller to the PIM to implement right-justified or left-justified PWM switching via the semiconductor switches.

14. The method of claim 10, further comprising:
automatically inserting the adjustable deadtime, at each PWM switching transition of the PIM, to avoid cross-conduction of the semiconductor switches.

15. The method of claim 10, further comprising:
computing the transition time as a function of the fundamental electrical period of the electric machine.

16. The method of claim 10, further comprising:
measuring a rotational speed of the electric machine;
receiving a DC link voltage;
calculating a back electromotive force (EMF) of the electric machine using the measured rotational speed; and
computing the initial deadtime using a ratio of the back EMF to the DC link voltage.

17. The method of claim 10, further comprising:
using deadtime compensation to phase in a transition from the minimum deadtime to zero volts.

18. The method of claim 10, further comprising:
measuring a current vector angle of the phase currents when a motor speed sensor is faulted and current is flowing in the electric machine;
calculating a filtered time derivative of the measured current vector angle;
estimating a speed of the electric machine using the filtered time derivative;
calculating the back electromotive force (EMF) of the electric machine using the estimated speed; and
computing the initial deadtime using a ratio of the back EMF to the DC link voltage.

19. A vehicle comprising:
an electric traction motor, wherein the electric traction motor is a three-phase, interior permanent magnet synchronous electric machine having a negative d-axis current;
a transmission coupled to the electric traction motor, wherein the transmission receives motor torque from the electric traction motor;
a DC bus;
an AC bus;
a DC power supply;
a traction power inverter module (TPIM) electrically connected to the DC power supply via the DC bus, and to the electric traction motor via the AC bus, wherein the TPIM includes a set of semiconductor switches that are controlled to convert an AC voltage to a DC voltage, and vice versa; and
a controller in communication with the TPIM that is configured to:
detect a fault condition of the vehicle;
set pulse width modulation (PWM) duty cycles of all three phases of the traction motor to 50% such that all three phases switch simultaneously;
apply a three-phase OPEN state to the AC bus in response to the detected fault condition;
determine an initial deadtime; and transition to a three-phase SHORT state as a remedial action by automatically inserting an adjustable deadtime at each PWM switching transition of the TPIM over a calculated ramp duration, thereby transitioning from the initial deadtime to a minimum deadtime over the calculated ramp duration;

wherein the transition reduces peak overshoot of the negative d-axis current of the traction motor during the fault condition.

20. The vehicle of claim 19, wherein the transmission includes a gear set having first, second, and third nodes, and wherein:

the electric traction motor is selectively connected to the first node or directly connected to the third node; and the second node is directly connected to an output member of the transmission.

* * * * *